US012180046B2

(12) United States Patent
Bowes

(10) Patent No.: US 12,180,046 B2
(45) Date of Patent: Dec. 31, 2024

(54) HOOK FOR USE WITH A FAIRLEAD

(71) Applicant: Quadratec, Inc., West Chester, PA (US)

(72) Inventor: David M. Bowes, Glenmoore, PA (US)

(73) Assignee: Quadratec, Inc., West Chester, PA (US)

( * ) Notice: Subject to any disclaimer, the term of this patent is extended or adjusted under 35 U.S.C. 154(b) by 153 days.

(21) Appl. No.: 17/515,975

(22) Filed: Nov. 1, 2021

(65) Prior Publication Data

US 2023/0138730 A1 May 4, 2023

(51) Int. Cl.
*B66D 3/26* (2006.01)
*B66D 1/30* (2006.01)

(52) U.S. Cl.
CPC *B66D 3/26* (2013.01); *B66D 1/30* (2013.01)

(58) Field of Classification Search
CPC ... B66D 1/36; B66D 1/38; B66D 1/30; B66D 3/26; B66C 1/10; B66C 1/14; B66C 1/34; B66C 5/00; F16G 11/02; F16G 11/143; F16G 11/12; F16B 45/00
USPC .......................................................... 254/264
See application file for complete search history.

(56) References Cited

U.S. PATENT DOCUMENTS

| | | | | |
|---|---|---|---|---|
| 9,388,025 B2 * | 7/2016 | Costa | .................... | F16G 11/146 |
| 10,519,012 B1 * | 12/2019 | Hare | ........................ | B66D 1/36 |
| 2017/0121154 A1 * | 5/2017 | Costa | ...................... | B66C 15/00 |
| 2019/0127190 A1 * | 5/2019 | Fretz | ........................ | B66D 1/60 |

* cited by examiner

*Primary Examiner* — Michael R Mansen
*Assistant Examiner* — Henrix Soto

(57) ABSTRACT

A winch hook comprises a hook portion and a loop receiving portion adapted for receiving a loop of a winch line. At least one three-dimensional feature of the winch hook is adapted to engage at least one three-dimensional feature of a fairlead so that the hook engages the fairlead while the hook is in at least four different orientations relative to the fairlead.

9 Claims, 22 Drawing Sheets

HOOK FOR USE WITH A FAIRLEAD

The present invention relates to winching and specifically to winch hooks and fairleads. In particular, a method and apparatus are described for engaging a hook to a fairlead in multiple orientations.

BACKGROUND OF THE INVENTION

Winches are well known devices with useful vehicle applications. At times, a vehicle may become stuck and unable to move. Common causes of this undesirable situation are ice, mud, sand or water. A vehicle in any of those situations may not have sufficient traction to move. Other times, a vehicle may sink into snow or mud that blocks the vehicle from moving forward or backward. In yet other situations, a vehicle may be in an off-road environment, and obstacles including rocks, trees and/or mud may prevent vehicle movement.

A winch may be used when a vehicle is unable to move independently. The winch is attached via a cable to a hook and/or anchor that is in turn attached to an anchor point (such as a tree). The winch's motor is then engaged to create pulling force on the cable. The pulling force on the cable typically is sufficient to extract the vehicle from its immobilized position.

FIG. 1 is a perspective drawing that illustrates a winch mounted in a front bumper of a vehicle in accordance with the prior art. Vehicle 100 is an exemplary off-road vehicle. Bumper 102 is attached to the front of vehicle 100. Winch 104 is located in bumper 102 and may be, for example, a Stealth winch manufactured by Quadratec, Inc., West Chester, PA (Stealth is a registered trademark of Quadratec).

Winch 104 includes winch cable 106, which is typically either steel or synthetic. Winch cable 106 terminates at loop 114. Attached to loop 114 is winch hook 108. Hook 108 is coupled to an anchor point, such as a tree, a stump, a rock, another vehicle, or a buried object. When coupled to natural objects, a tree trunk protector may be typically used. When coupled to another vehicle, coupling is typically accomplished by attaching to the other vehicle's bumper or directly to the vehicle frame.

FIG. 2 is a perspective drawing that illustrates a winch mounted to a winch plate of a vehicle in accordance with the prior art. As shown, winch 104 is mounted to winch plate 105 that in turn is attached to vehicle 100. Hawse fairlead 110 is attached to the front of winch plate 105. Winch cable 106 extends through opening 112 and is attached to hook 108. Hook 108 is located in front of fairlead 110.

FIG. 3 is a close-up view of loop 114. Cable 116 is formed into loop 114 via splice 106. Loop 114 typically includes thimble 115 for added durability.

SUMMARY OF THE INVENTION

A winch hook comprises a hook portion and a loop receiving portion adapted for receiving a loop of a winch line. At least one three-dimensional feature of the winch hook is adapted to engage at least one three-dimensional feature of a fairlead so that the hook engages the fairlead while the hook is in at least four different orientations relative to the fairlead.

DETAILED DESCRIPTION

Figure 1:
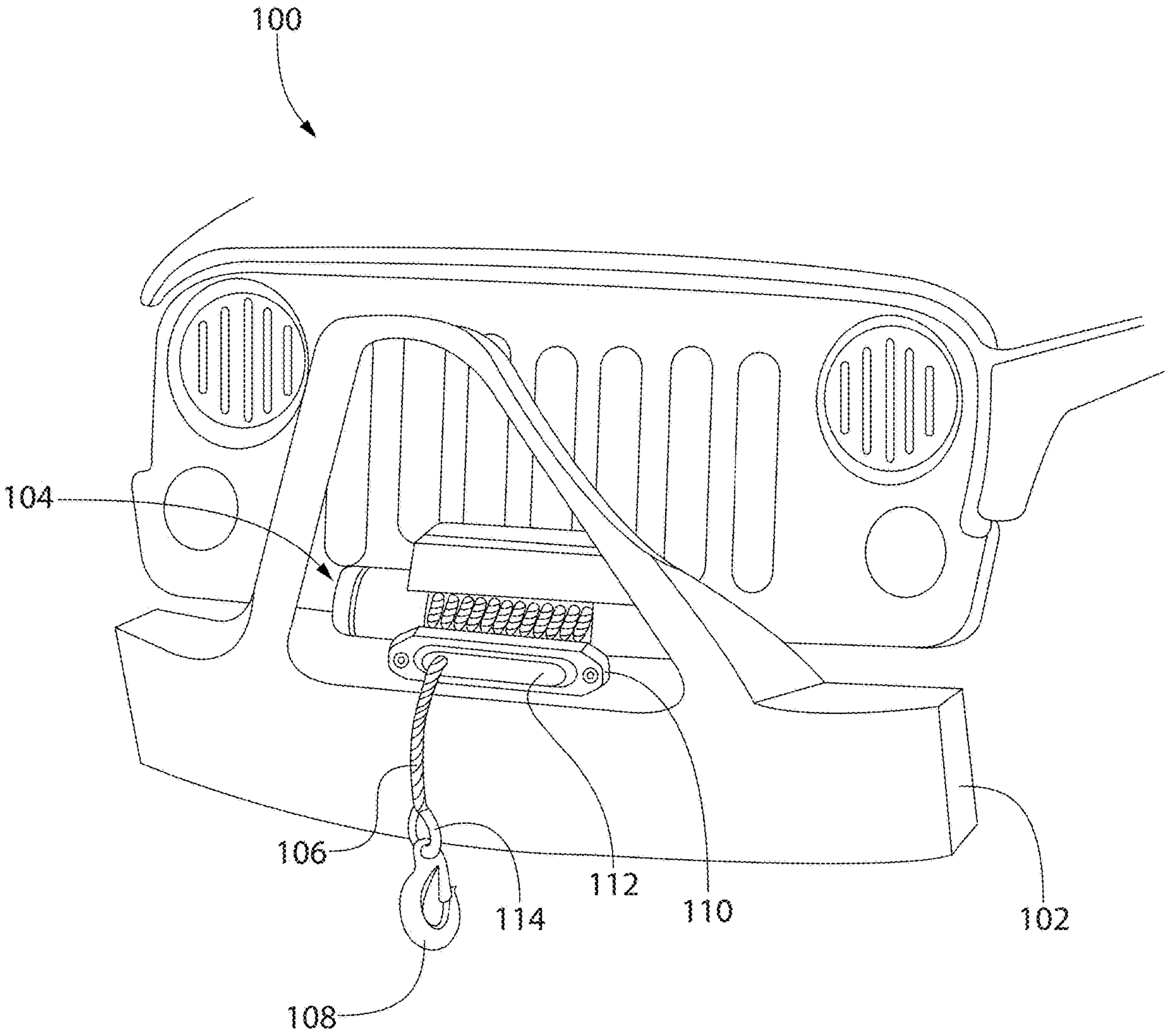
FIG. 1 is a perspective drawing that illustrates a winch mounted in a front bumper of a vehicle in accordance with the prior art.
Figure 2:
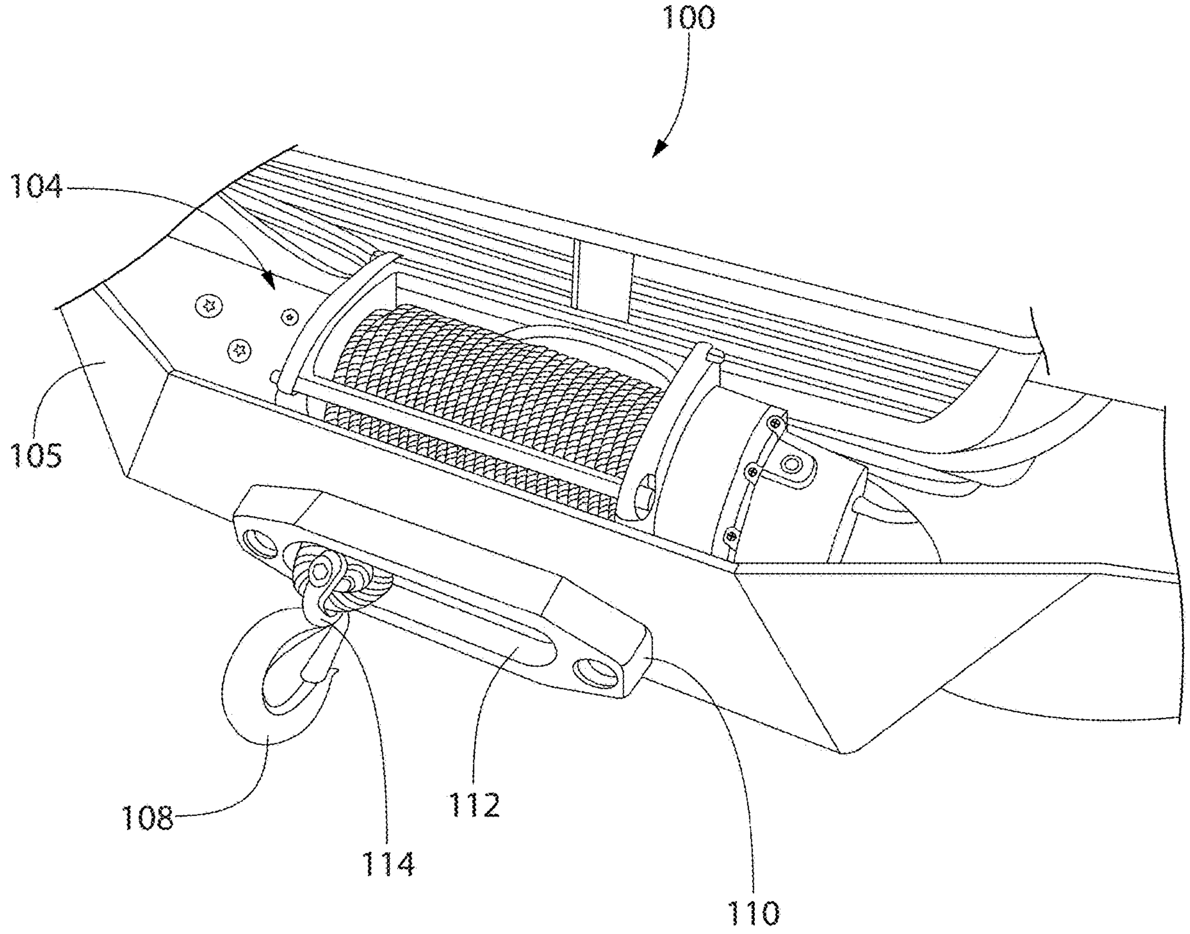
FIG. 2 is a perspective drawing that illustrates a winch mounted to a winch plate of a vehicle in accordance with the prior art.
Figure 3:
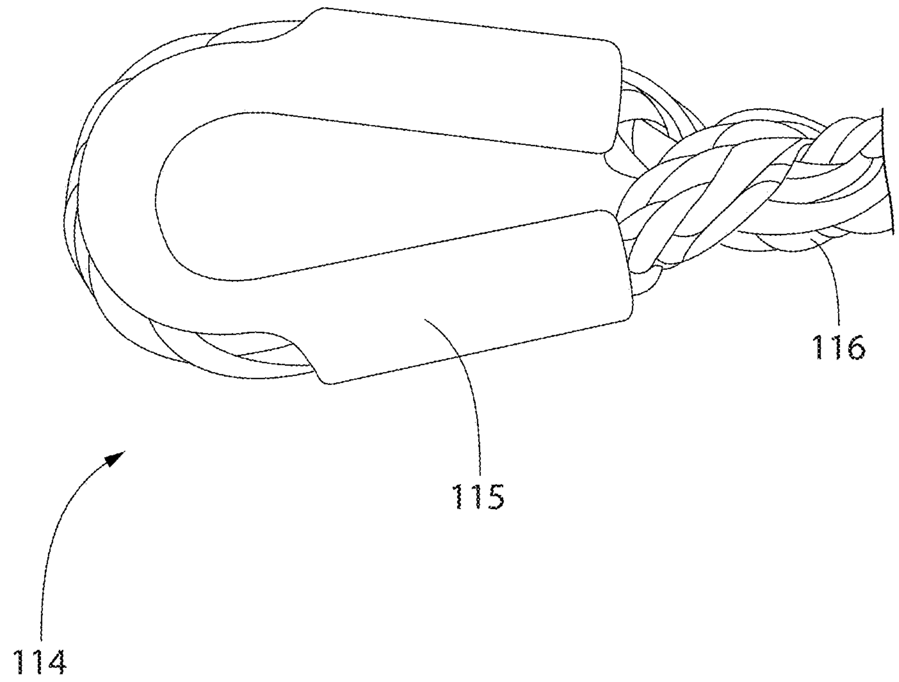
FIG. 3 is a perspective drawing that illustrates the loop at the end of a winch cable in accordance with the prior art.
Figure 4:
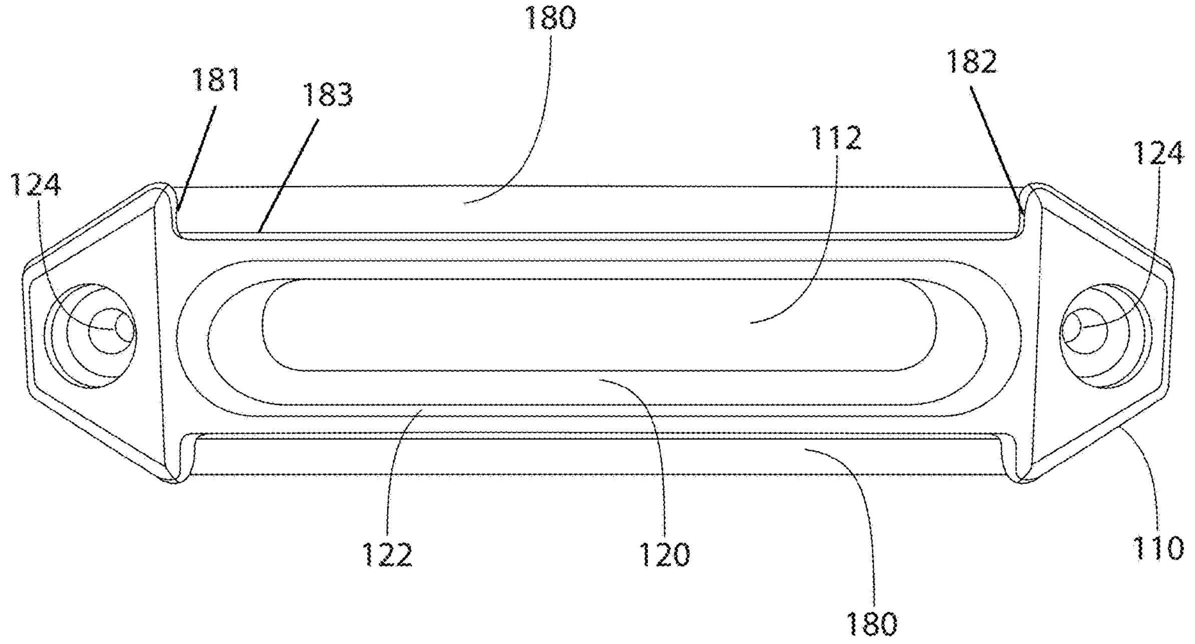
FIG. 4 is a front view of a hawse fairlead in accordance with an exemplary embodiment of the present invention.

FIG. 4 is a front view of hawse fairlead 110 in accordance with an exemplary embodiment of the present invention. Fairlead 110 includes attachment locations 124 to attaching fairlead 110 to a vehicle. Attachment may be accomplished by attaching fairlead 110 to a bumper, attaching fairlead 110 to a winch plate, or attaching fairlead 110 via another structural item. Attachment locations 124 may be openings that accept bolts, welded bolts that engage openings in a structural member included or attached to a vehicle, tabs, or some other attachment mechanism. Fairlead 110 includes opening 112 through which winch cable 106 extends. Opening 112 is surrounded by exit surface 120 that is typically flat. Edge 122 may be a curved surface to facilitate movement of cable 106 through opening 112. Fairlead 110 may also include feature/indentation 180. Feature/indentation 180 is a three-dimensional feature that is adapted for receiving a corresponding surface of a winch hook. As an example, feature/indentation 180 may be an area that is not flat. Examples of an area that is not flat may include an area that is curved, an area that includes surfaces that are parallel to more than one plane, an area with a surface in a plane that is different than the front surface of fairlead 110, an area that opposes a downward force of a hook when the hook is placed adjacent to fairlead 110, etc. Feature/indentation 180 is at least partially defined by left side projection 181, right side projection 182, and bottom surface 183 (optionally comprised of said surfaces). In another embodiment, the entire front facing surface of fairlead 110 is not flat. In another embodiment, the front of fairlead 110 is comprised of more than one surface that are not in the same plane. In another embodiment, the front surface of fairlead 110 forms a physical pattern, and at least a portion of a hook is able to engage at least a portion of the physical pattern.

Fairlead 110 is typically composed of a strong material. Exemplary materials include metals such as steel and aluminum. Other materials with sufficient strength to be included in a winching system may also be used.

Figure 5:
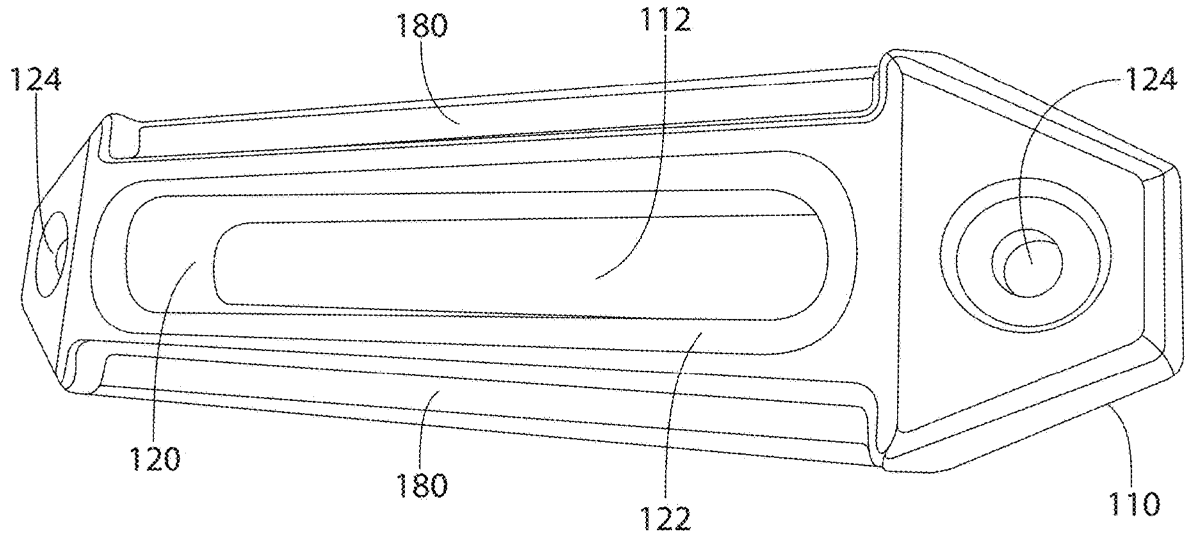
FIG. 5 is a perspective view of the front side of a hawse fairlead in accordance with an exemplary embodiment of the present invention.

FIG. 5 is a perspective view of the front side of a hawse fairlead in accordance with an exemplary embodiment of the present invention. Feature 180 is shown as forming a three-dimensional pattern.

Figure 6:
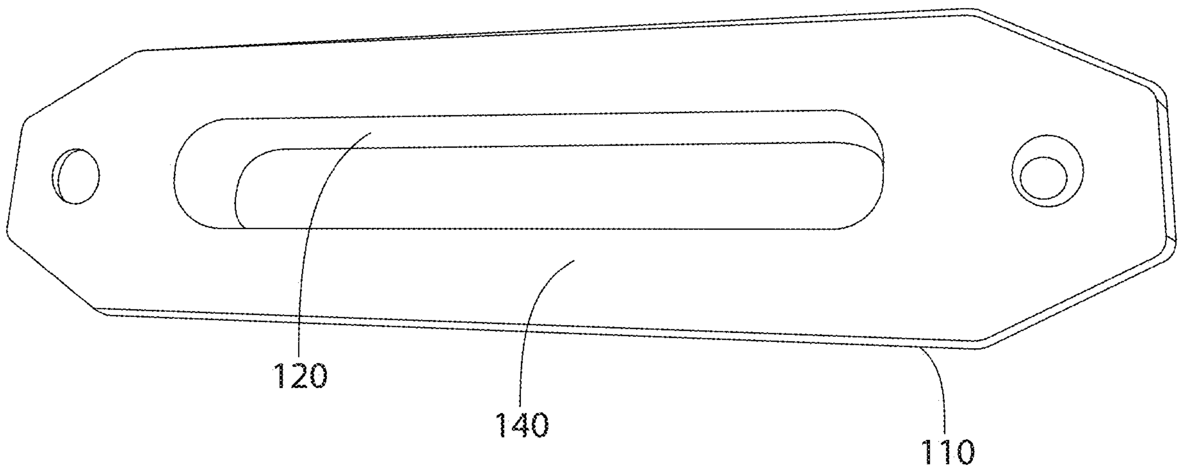
FIG. 6 is a perspective view of the rear side of a hawse fairlead in accordance with an exemplary embodiment of the present invention.

FIG. 6 is a perspective view of the rear side of a hawse fairlead in accordance with an exemplary embodiment of the present invention. Rear 140 may be a surface that engages a surface situated on or near a front of vehicle 100. Rear 140 may be flat, for example. Rear 140 may touch the front of a vehicle bumper, the front of a vehicle winch plate, or another part included in or attached to a vehicle.

Figure 7:
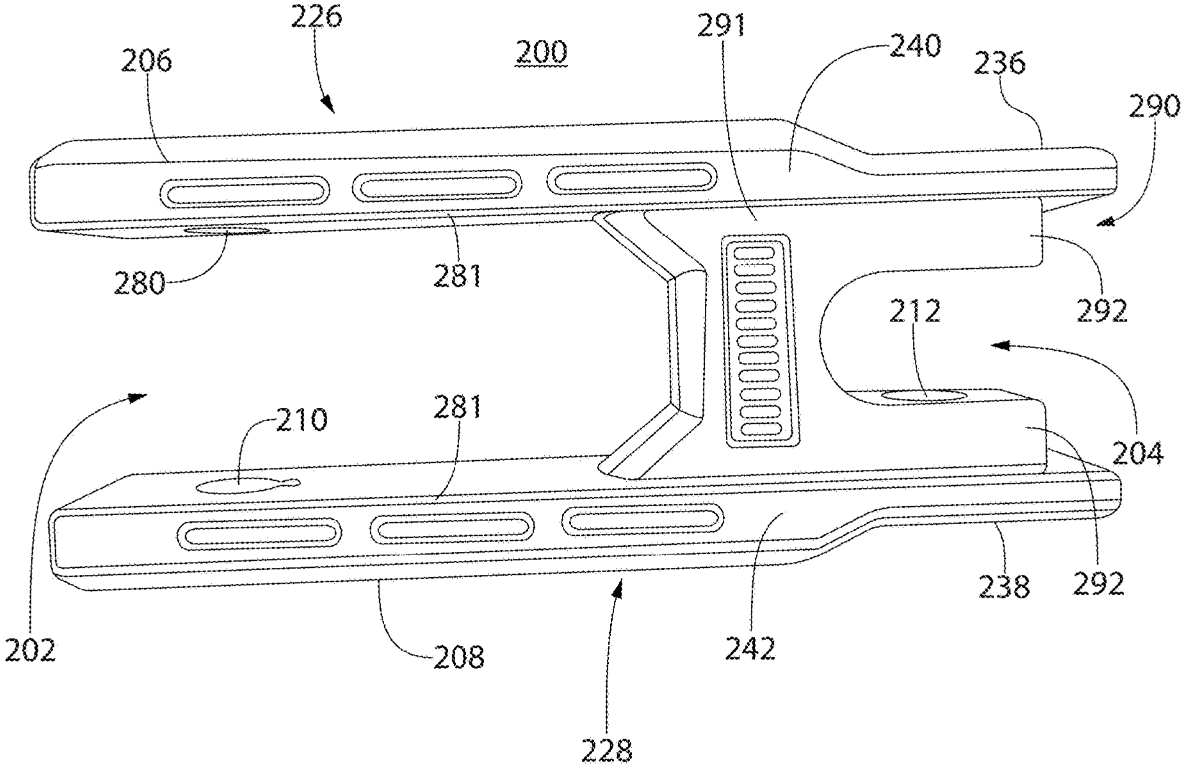
FIG. 7 is a front view of a winch hook in accordance with an exemplary embodiment of the present invention.

FIG. 7 is a front view of winch hook 200 in accordance with an exemplary embodiment of the present invention. Hook 200 is composed of a strong material. Exemplary materials include metals such as steel and aluminum. Other materials with sufficient strength to be included in a winching system may also be used.

Hook 200 includes two sections: first member 226 that extends along the top of FIG. 7 and second member 228 that extends along the bottom of FIG. 7. First member 226 includes prong 206 and prong 236. Second member 228 includes prong 208 and prong 238. Prong 206 and prong 208 define opening 202. Prong 236 and prong 238 may, in one embodiment, define opening 204. Middle member 290 attaches first member 226 and second member 228 to each other. In one embodiment, middle member 290 includes full member 291, and partial members 292 are excluded. In that embodiment, prong 236 and prong 238 define opening 204. In another embodiment, middle member 290 includes full member 291 as well as partial members 292. In that embodiment, partial members 292 define opening 204. Pin 318 (which appears in FIGS. 13A-D but is omitted from FIG. 7) extends between prong 206 and prong 208. Pin 320 (which appears in FIGS. 13A-D but is omitted from FIG. 7) extends between prong 236 and prong 238.

First member 226 and second member 228 each include surfaces on opposite sides thereof. In the figures, when one surface of first member 226 and second member 228 are "face-up" and hence visible, the other surface of first member 226 and second member 228 are "face-down" and not visible. For example, if FIG. 7, first surface 240 and second surface 242 are "face-up" and hence visible. By contrast, third surface 250 and fourth surface 252 are visible in FIG. 13B because they are "face-up" in FIG. 13B, but they are not visible in FIG. 7 because they are "face-down" in FIG. 7.

Prong 206 includes opening 280. In an exemplary embodiment, opening 280 extends completely through prong 206. Prong 208 includes opening 210. In an exemplary embodiment, opening 210 extends completely through prong 208. Pin 318 (shown in FIGS. 13A-13D) extends between opening 280 and opening 210.

Prong 236 includes opening 213. In an exemplary embodiment, opening 213 extends partially through prong 236 without extending completely through prong 236. Prong 238 includes opening 212. In an exemplary embodiment, opening 212 extends completely through prong 238. Pin 320 (shown in FIGS. 9 and 13A-13D) extends between opening 212 and opening 213.

Prong 206 and prong 208 include feature 281. Feature 281 is a physical feature that enables prong 226 and prong 228 to mate with feature 180 of fairlead 110. Feature 281 is included on both sides of hook 200, namely the "face-up" side of hook 200 that appears in each of the figures and the "face-down" side of hook 200 that is obscured in each of the figures. Feature 281 may also be an area that is adapted for receiving a corresponding surface of fairlead 110. As an example, feature 281 may be an area that is not flat. Examples of an area this is not flat may include an area that is curved, an area that includes surfaces that are parallel to more than one plane, an area with a surface in a plane that is different than the front surface of fairlead 110, an area that opposes an upward force of a fair lead 110 when the hook is placed adjacent to fairlead 110, etc. In another embodiment, the entire front facing surface and rear facing surface of hook 200 is not flat. In another embodiment, the front facing surface and rear facing surface of hook 200 is comprised of more than one surface that is not in the same plane. In another embodiment, the front facing surface and rear facing surface of hook forms a physical pattern, and at least a portion of fairlead 110 is able to engage at least a portion of the physical pattern.

The above paragraphs include the terms front facing, rear facing, face-up and face-down. A surface transitions between front facing and rear facing by (vitually) rotating hook 200 into various configurations as illustrated in FIGS. 13A-D. A surface transitions between front facing and rear facing by (virtually) rotating hook 200 as illustrated in FIGS. 13A-D.

In another embodiment feature 180 and feature 281 are two parallel surfaces that engage each other.

Figure 8:
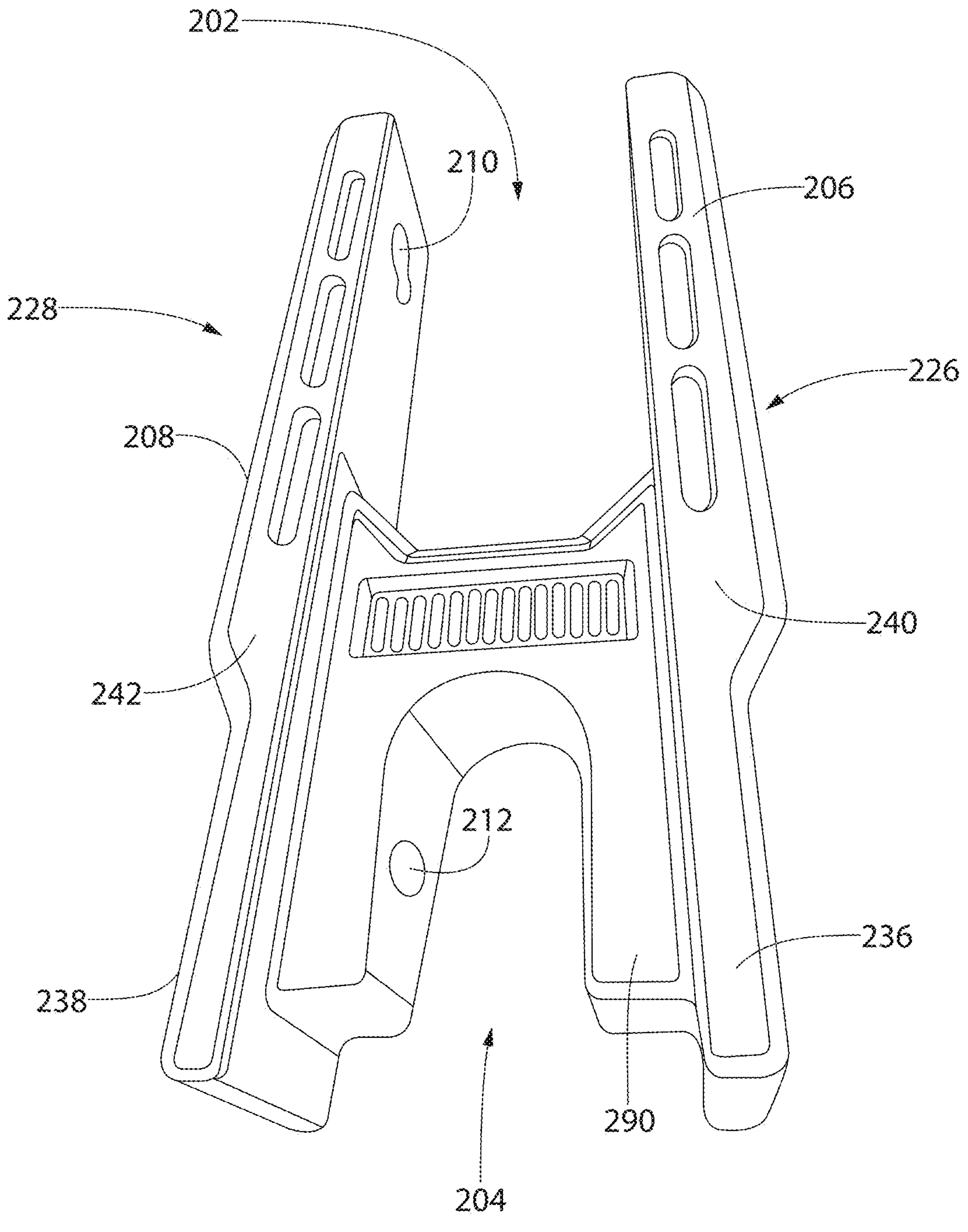
FIG. 8 is a perspective view of the winch hook that is illustrated in FIG. 7.

FIG. 8 is a perspective view of the winch hook that is illustrated in FIG. 7.

Figure 9:
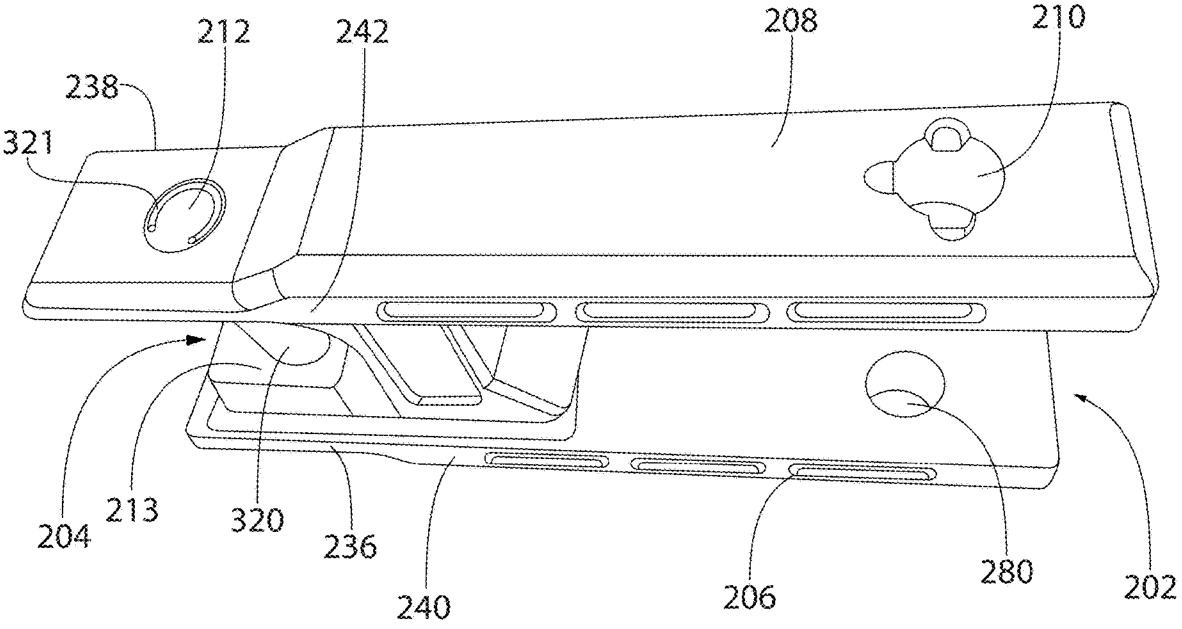
FIG. 9 is a further perspective view of the winch hook that is illustrated in FIG. 7.

FIG. 9 is a further perspective view of the winch hook that is illustrated in FIG. 7. FIG. 9 includes pin 320 that extends between opening 212 and opening 213. As opening 213 extends partially through prong 236 (without extending completely through prong 236), pin 320 makes contact with a bottom surface of opening 213 within prong 236. Snap ring 321 holds pin 320 stationary within opening 212. As one end of pin 320 is held in place with snap ring 321 and another end of pin 320 is held in place with the bottom surface of opening 213 within prong 236, pin 320 is held stationary between prong 236 and prong 238.

Figure 10:
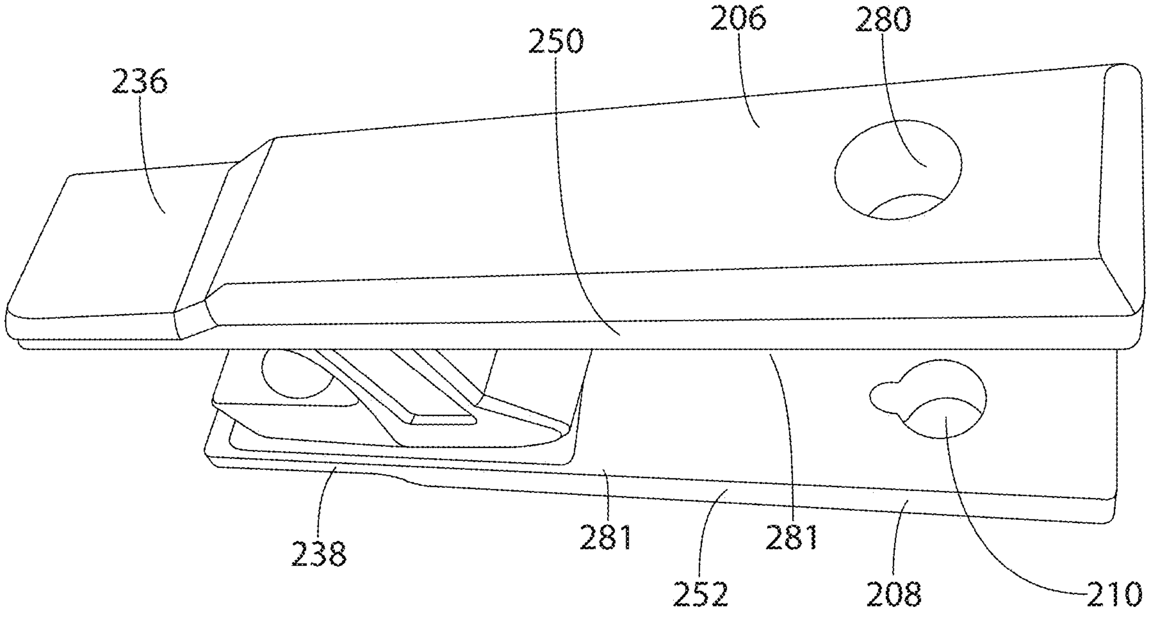
FIG. 10 is a further perspective view of the winch hook that is illustrated in FIG. 7.

FIG. 10 is a further perspective view of the winch hook that is illustrated in FIG. 7.

Figure 11:
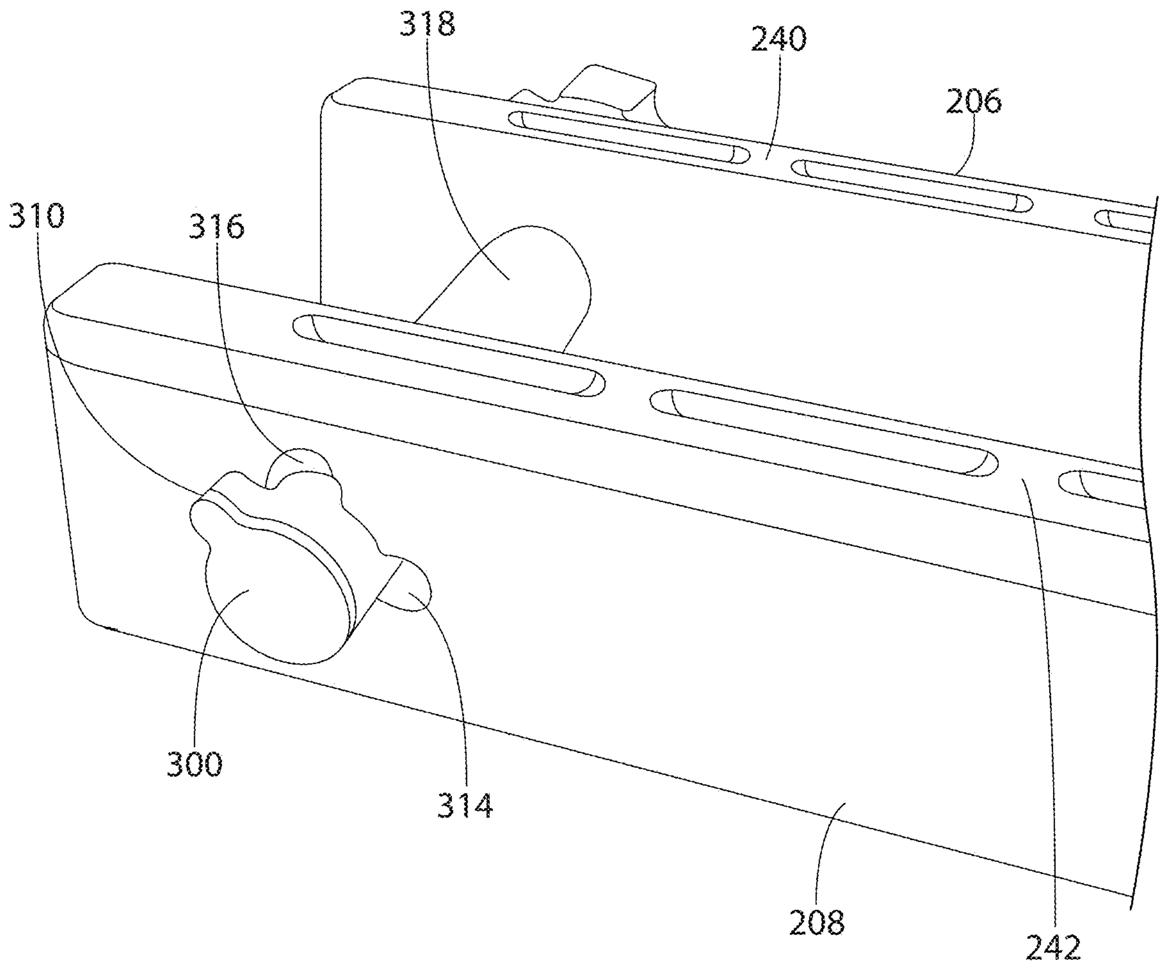
FIG. 11 is a perspective view of the winch hook that is illustrated in FIG. 11 with an exemplary pin that closes the hook.

FIG. 11 is a perspective view of the winch hook that is illustrated in FIG. 11 with pin 318 that closes hook 200. Pin 318 includes end 300 with tab 310 that projects therefrom and that slides through channel 314 of prong 208. Prong 208 includes indent 316 in which tab 310 resides. During use of hook 200, pin 318 slides through prong 208 to form an opening between prong 206 and prong 208. By creating an opening between prong 206 and prong 208 a tree saver can be slide therebetween. Pin 318 is then slid through opening 210 and is rotated so that tab 310 seats in channel 314. In this manner, the opening between prong 206 and 208 is closed, and a tree saver (or other belt/rope type member) may be maintained therein.

Figure 12:
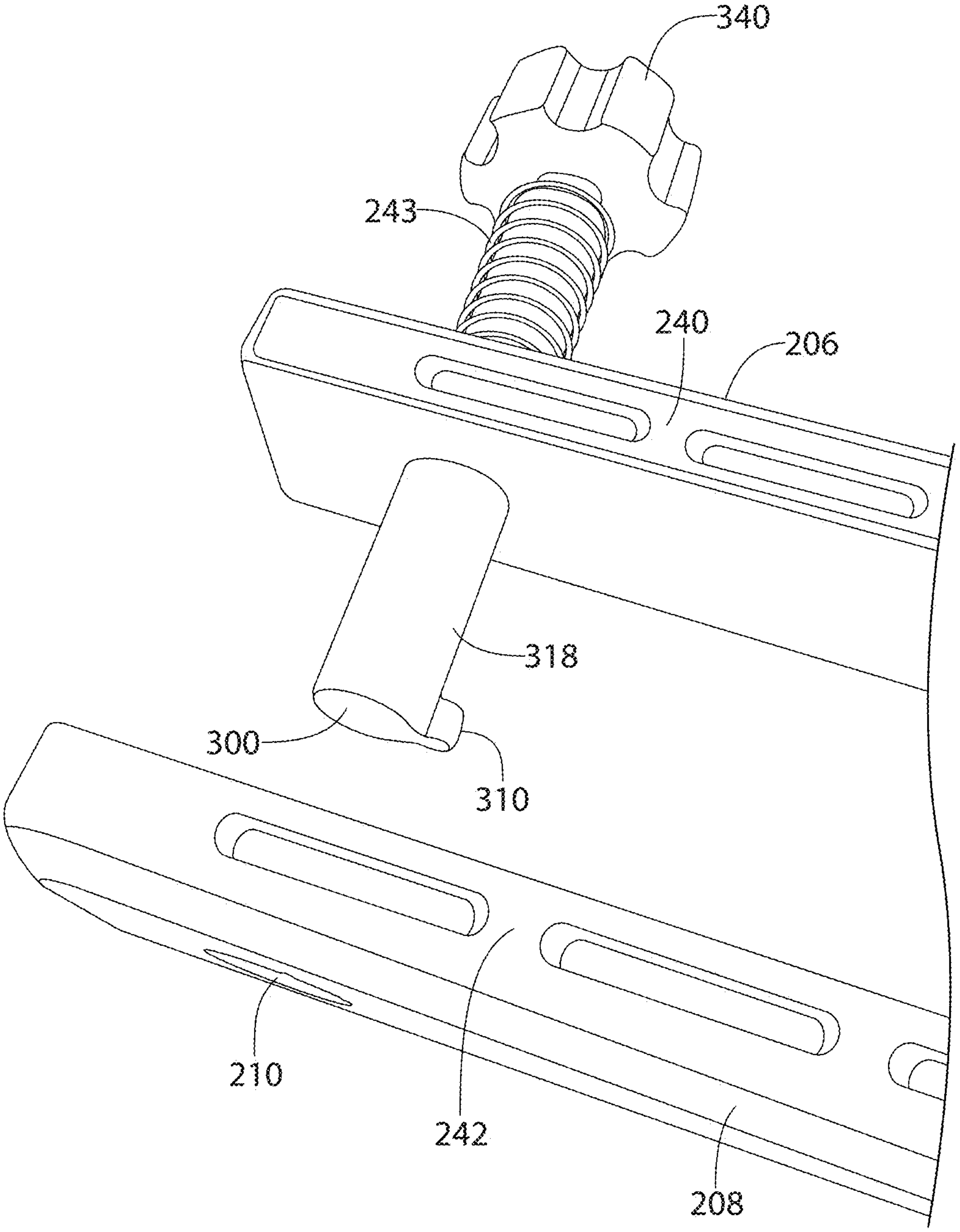
FIG. 12 is a further perspective view of the winch hook that is illustrated in FIG. 11 with the exemplary pin that closes the hook.

FIG. 12 further illustrates pin 318 retracted from opening 210 to enable a tree saver to be inserted between prong 206 and prong 208. After pin 318 is inserted through opening 210, knob 340 may be rotated about threads included in pin 318 to seat knob 340 against prong 206. In this manner, tab 310 is pulled towards prong 208 in order to maintain pin 318 stationary relative to prong 206 and prong 208. While the use of threads is an example of how to seat knob 340 against prong 206, knob 340 may be seated against prong 206 using other mechanical mechanisms as well including clamps, friction holds, telescoping male/female shafts with internal spring loaded pins to maintain final position, etc.

When pin 318 is fully inserted into opening 210, an internal space is created through which a tree saver or other line extends. The internal space defined by fully inserting pin 318 into opening 210 may be referred to as a closed hook internal space. When pin 320 is fully inserted into openings 212 and 213, an internal space is created through which a loop (or other hook) at the end of a winch line may extend. The internal space defined by fully inserting pin 320 into openings 212 and 213 may be referred to as a further closed hook internal space.

FIG. 12 illustrates optional spring 243. By placing a pushing force against knob 340 (with a downward force from a hand), spring 243 is compressed. When pushing force against knob 340 is removed, spring 243 applies force in the direction opposite to the direction of the pushing force. When tab 310 is seated within indent 316, spring force from compressed spring 243 holds pin 318 in place within opening 210 and opening 280.

FIGS. 13A-13D illustrate that hook 200 may be mated with fairlead 110 in at least four orientations. In each orientation, feature 281 and feature 180 face each other. The physical shape of feature 281 and feature 180 allows hook 200 to engage fairlead 110 in at least four orientations. When fairlead 110 and hook 200 engage each other, hook 200 remains stationary relative to fairlead 110. For example, fairlead 110 is typically located at the front end of a vehicle. When fairlead 110 and hook 200 are stationary relative to each other on a vehicle, the vehicle may be driven and fairlead 110 and hook 200 remain stationary relative to each other. In one example, the winch cable is attached to pin 320. The winch cable may be retracted so that the winch cable applies pulling force on hook 200 so that hook 200 is pulled towards fairlead 110. In this manner, fairlead 110 and hook 200 mate and fairlead 110 and hook 200 remain stationary relative to each other as the vehicle to which fairlead 110 is attached is driven.

In one embodiment, the force that holds hook 200 against fairlead 110 is obtained from the winch cable that is attached to pin 320. Thus, unspooling the winch cable enables hook 200 to be separated from fairlead 110.

FIGS. 13A-13D illustrate hook 200 mated with fairlead 110 in four respectively different ways. As shown, hook 200 includes first surface 240 and second surface 242 on one side of hook 200. As shown, hook 200 also includes third surface 250 and fourth surface 252 on another side of hook 200. In FIGS. 13A-13D, first surface 240 and second surface 242 are visible in two orientations (the orientations illustrated in FIG. 13A and FIG. 13C), while in those two orientations third surface 250 and fourth surface 252 are not visible because they are facing fairlead 110. Conversely, in FIGS. 13A-13D, third surface 250 and fourth surface 252 are visible in two orientations (the orientations illustrated in FIG. 13B and FIG. 13D), while in those two orientations first surface 240 and second surface 242 are not visible because they are facing fairlead 110. Each of the four respectively different orientations will now be described.

Figure 13A:
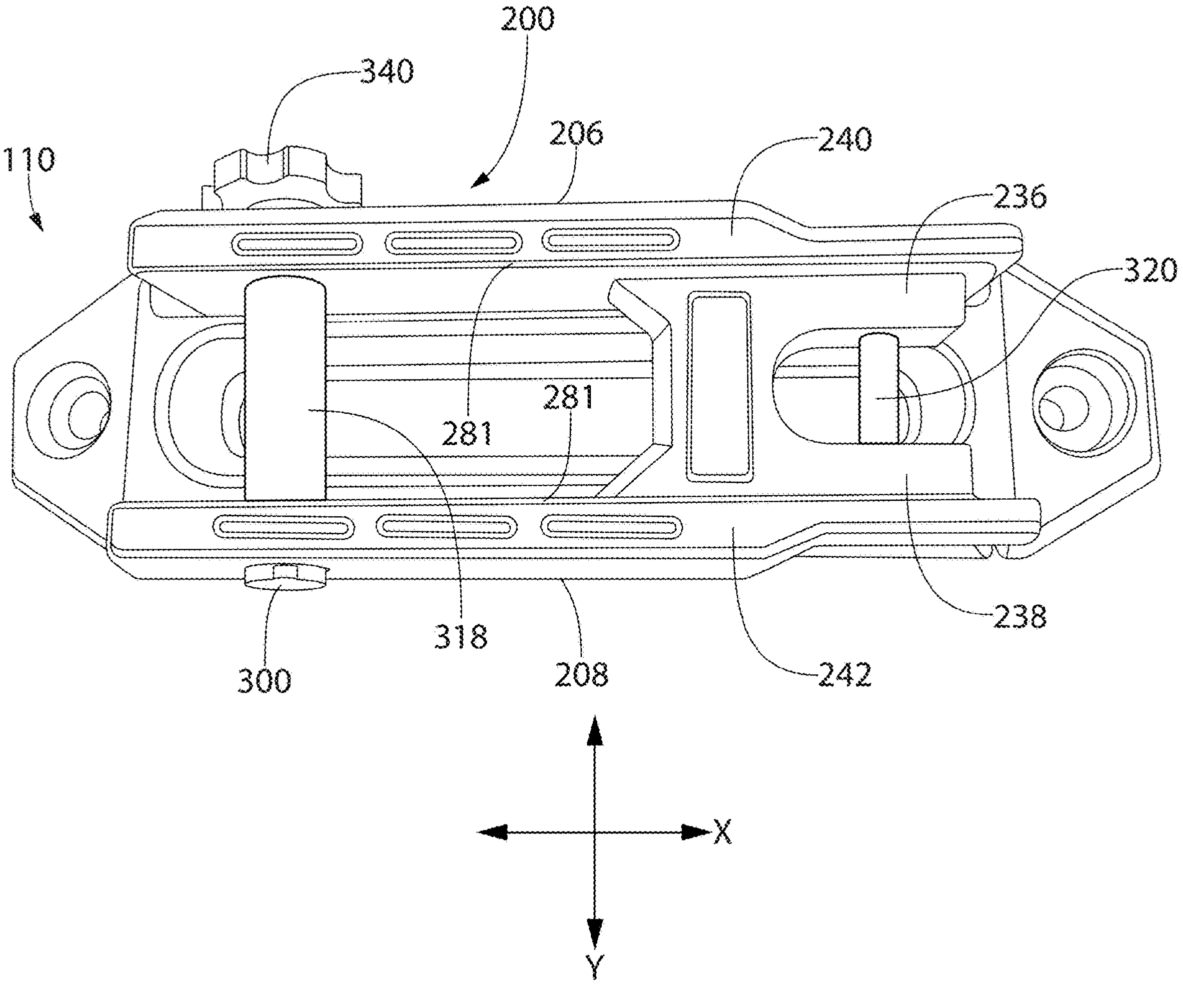
FIGS. 13A-D are front views of an exemplary hook that is mated to an exemplary fairlead in four respectively different orientations.

In FIG. 13A, pin 318 is illustrated towards the left of the figure and pin 320 is illustrated towards the right of the figure. Pin 318 is adapted to retain a tree hugger (or other cable/belt) and pin 320 is adapted to retain a loop (or other terminating member) at the end of a winch cable. Prong 206 is located towards the top left of the figure and prong 208 is located towards the bottom left of the figure. Prong 236 is located towards the top right of the figure and prong 238 is located towards the bottom right of the figure. Third surface 250 and fourth surface 252 are not visible in FIG. 13A because they are facing towards fairlead 110. First surface 240 and second surface 242 are visible because they are on the side of hook 200 opposite the side that is facing fairlead 110.

Figure 13B:
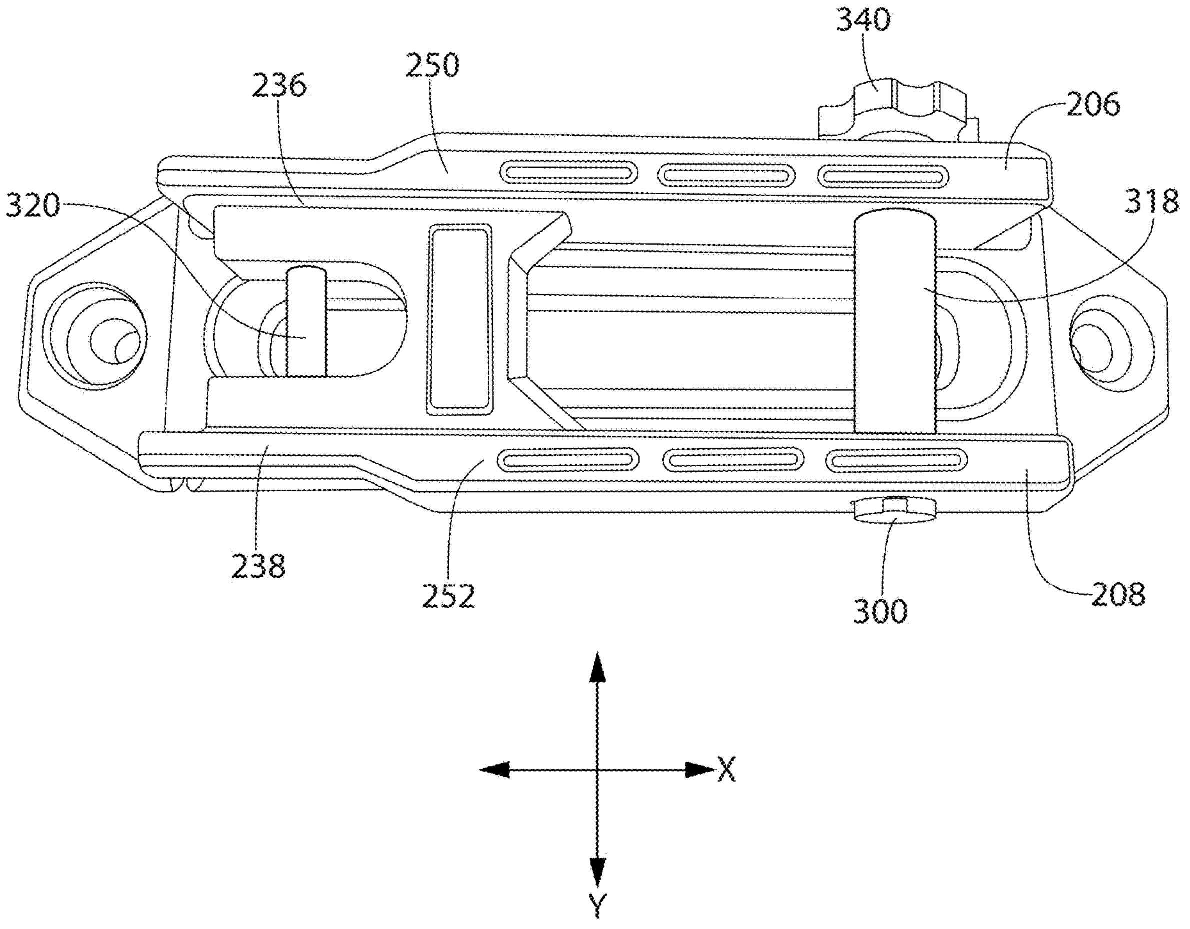

FIG. 13B illustrates hook 200 rotated about the Y-axis relative to the orientation of hook 200 in FIG. 13A. In FIG. 13B, pin 318 is illustrated towards the right of the figure and pin 320 is illustrated towards the left of the figure. Pin 318 is adapted to retain a tree hugger (or other cable/belt) and pin 320 is adapted to retain a loop (or other terminating member) at the end of a winch cable. Prong 206 is located towards the top right of the figure and prong 208 is located towards the bottom right of the figure. Prong 236 is located towards the top left of the figure and prong 238 is located towards the bottom left of the figure. First surface 240 and second surface 242 are not visible in FIG. 13B because they are facing towards fairlead 110. Third surface 250 and fourth surface 252 are visible because they are on the side of hook 200 opposite the side that is facing fairlead 110.

Figure 13C:
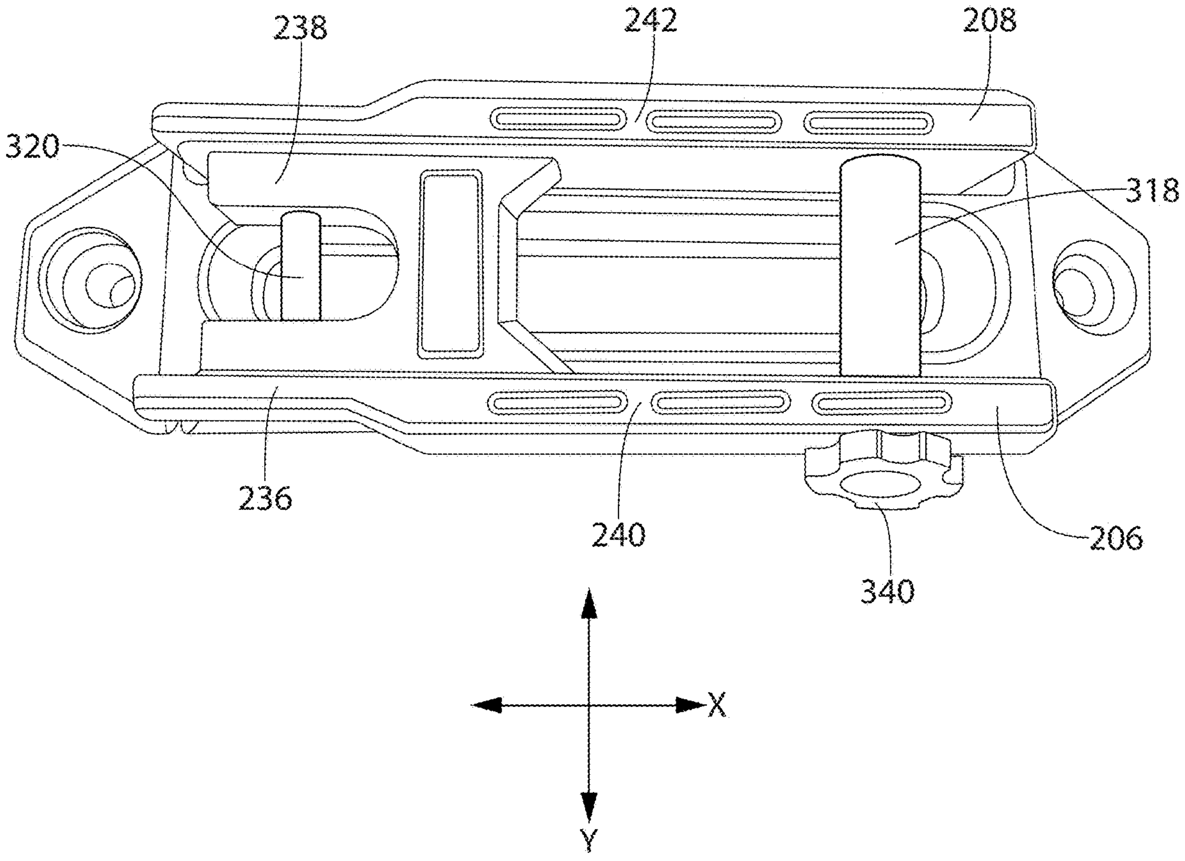

FIG. 13C illustrates hook 200 rotated about the X-axis relative to the orientation of hook 200 in FIG. 13B. In FIG. 13C, pin 318 is illustrated towards the right of the figure and pin 320 is illustrated towards the left of the figure. Pin 318 is adapted to retain a tree hugger (or other cable/belt) and pin 320 is adapted to retain a loop (or other terminating member) at the end of a winch cable. Prong 206 is located towards the bottom right of the figure and prong 208 is located towards the top right of the figure. Prong 236 is located towards the bottom left of the figure and prong 238 is located towards the top left of the figure. Third surface 250 and fourth surface 252 are not visible in FIG. 13C because they are facing towards fairlead 110. First surface 240 and second surface 242 are visible because they are on the side of hook 200 opposite the side that is facing fairlead 110.

Figure 13D:
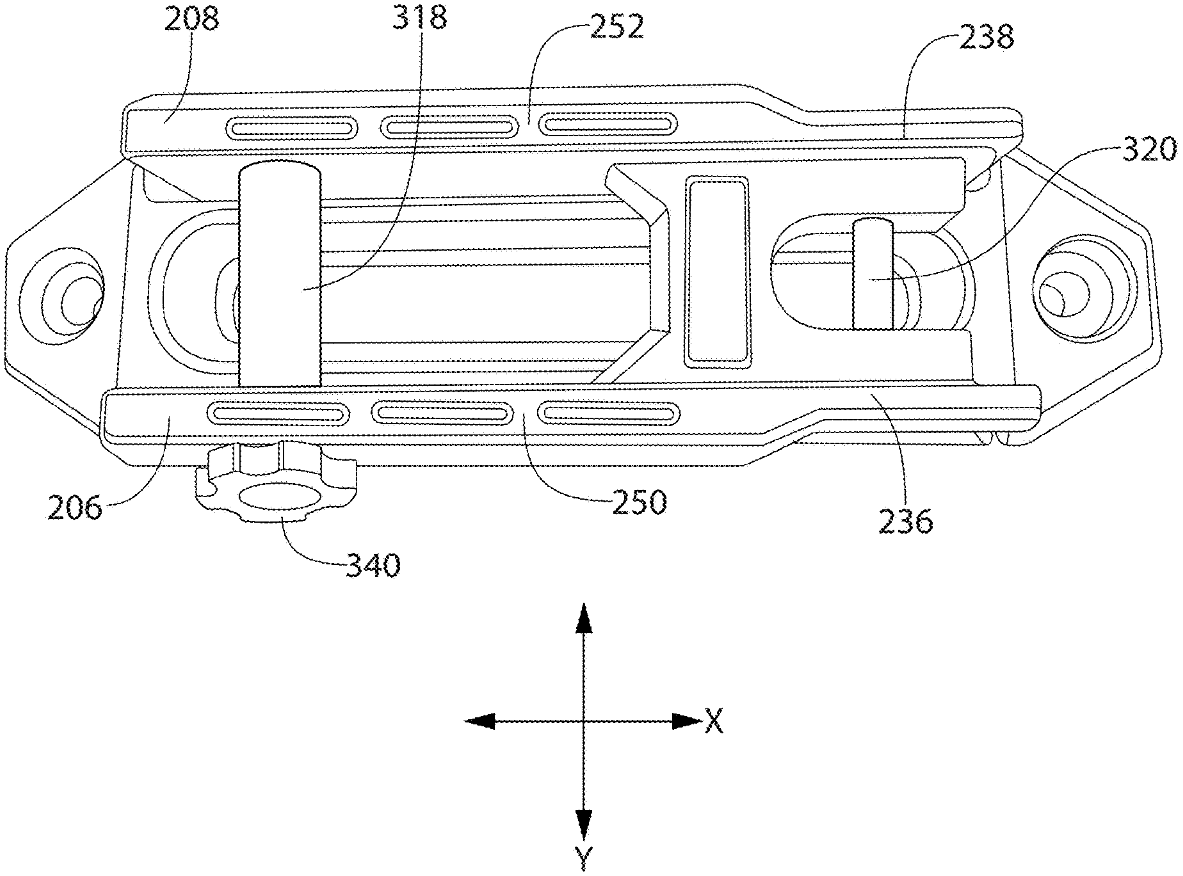

FIG. 13D illustrates hook 200 rotated about the Y-axis relative to the orientation of hook 200 in FIG. 13C. In FIG. 13D, pin 318 is illustrated towards the left of the figure and pin 320 is illustrated towards the right of the figure. Pin 318 is adapted to retain a tree hugger (or other cable/belt) and pin 320 is adapted to retain a loop (or other terminating member) at the end of a winch cable. Prong 206 is located towards the bottom left of the figure and prong 208 is located towards the top left of the figure. Prong 236 is located towards the bottom right of the figure and prong 238 is located towards the top right of the figure. First surface 240 and second surface 242 are not visible in FIG. 13B because they are facing towards fairlead 110. Third surface 250 and fourth surface 252 are visible because they are on the side of hook 200 opposite the side that is facing fairlead 110.

In each of FIGS. 13A-13D, hook 200 is mated with fairlead 110. In particular, each of FIGS. 13A-13D illustrate hook 200 stored adjacent to fairlead 110 in four different orientations. The ability to store hook 200 relative to fairlead 110 in four different orientations allows flexibility with regard to storage of hook 200. Other fairlead/hook combinations place limitations on the number of orientations in which a winch hook may be stored. See for example U.S. Pat. No. 10,519,012 in which the hook may only be stored relative to the fairlead "in one orientation only." In accordance with the present invention, flexibility is provided to enable the hook to be stored relative to the fairlead in four different orientations.

As previously described, fairlead 110 and hook 200 have structures that enable hook 200 to engage fairlead for storage in the manner shown by the present figures. Furthermore, the winch cable that is attached to hook 200 may be retracted by the winch so that hook 200 presses against fairlead 110. In this manner, hook 200 may be stored in the any of the positions illustrated in FIGS. 13A-13D while the vehicle to which fairlead 110 and hook 200 are attached is driven.

Figure 14:
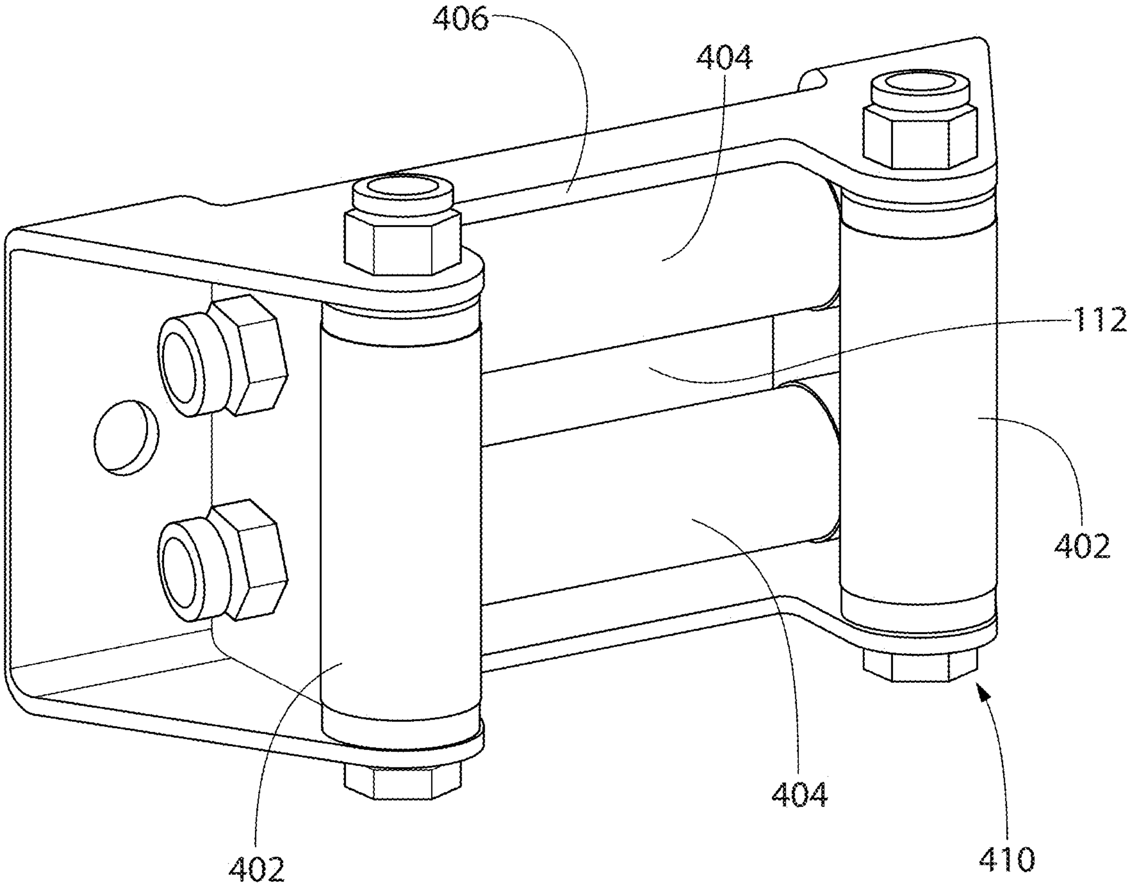
FIG. 14 is a perspective drawing of a roller fairlead.

FIG. 14 is a perspective view of a roller fairlead. Roller fairlead 410 includes vertical rollers 402 and horizontal rollers 404. Opening 112 is situated between both vertical rollers 402 and horizontal rollers 404. Vertical rollers 402 and horizontal rollers 404 are mounted on frame 406.

Figure 15:
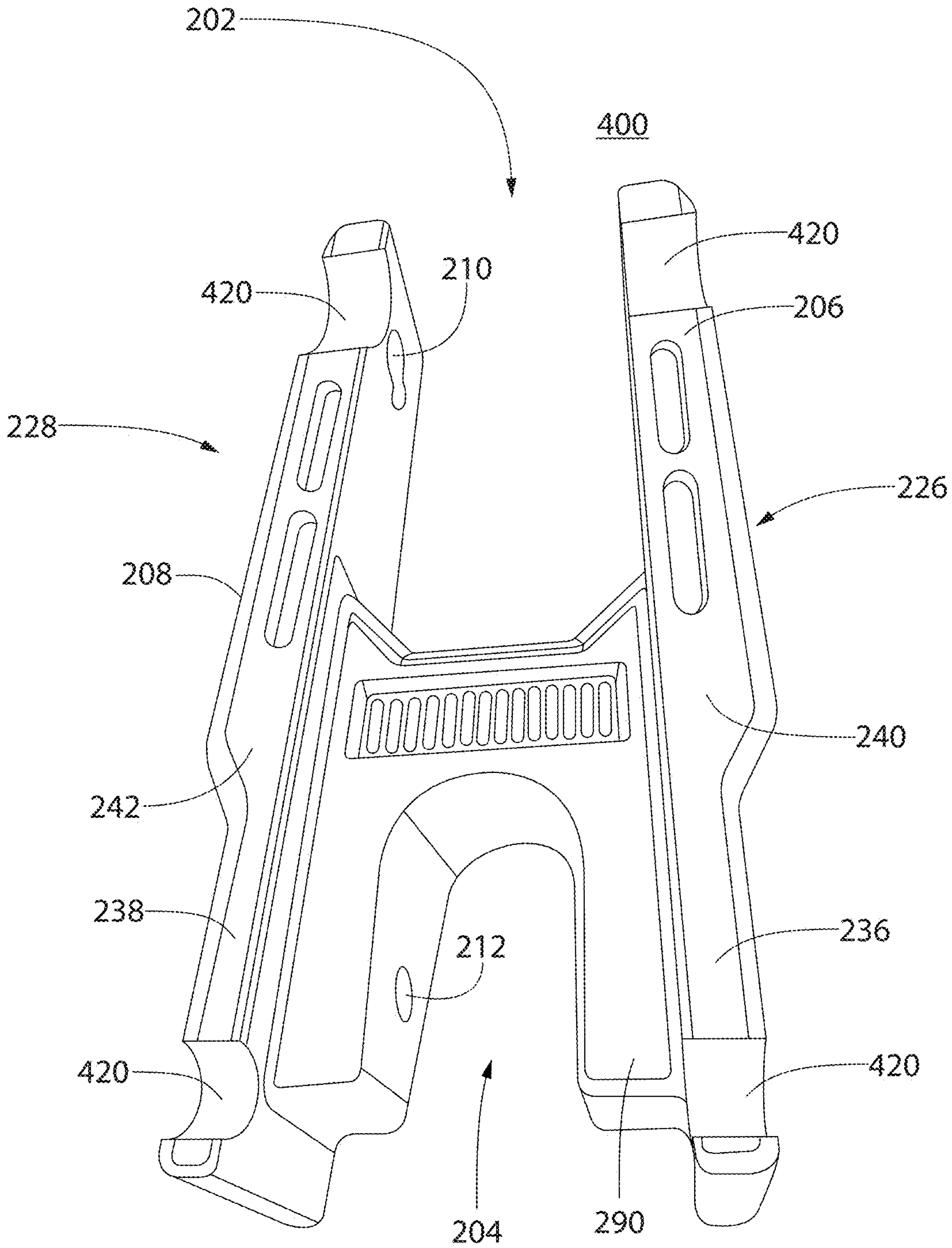
FIG. 15 is a perspective drawing of a hook that is suitable for mating with a roller fairlead.
Figure 16A:
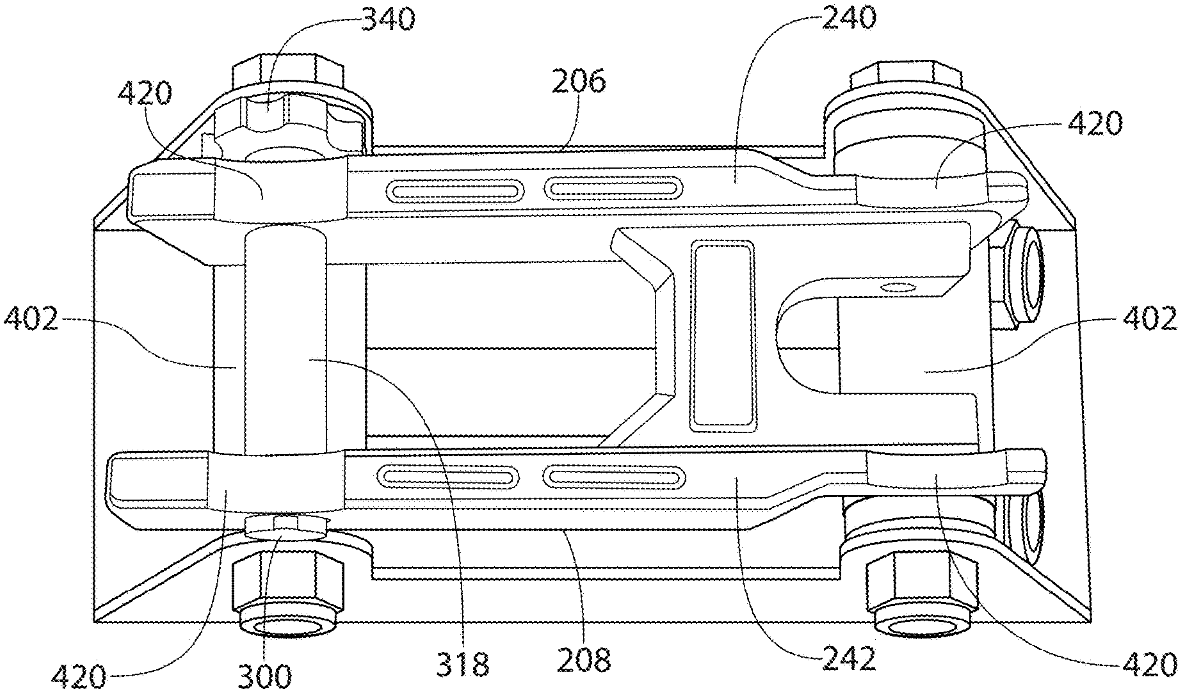
FIGS. 16A and 16B are front views of a hook that is mated to a roller fairlead in two respective orientations.
Figure 16B:
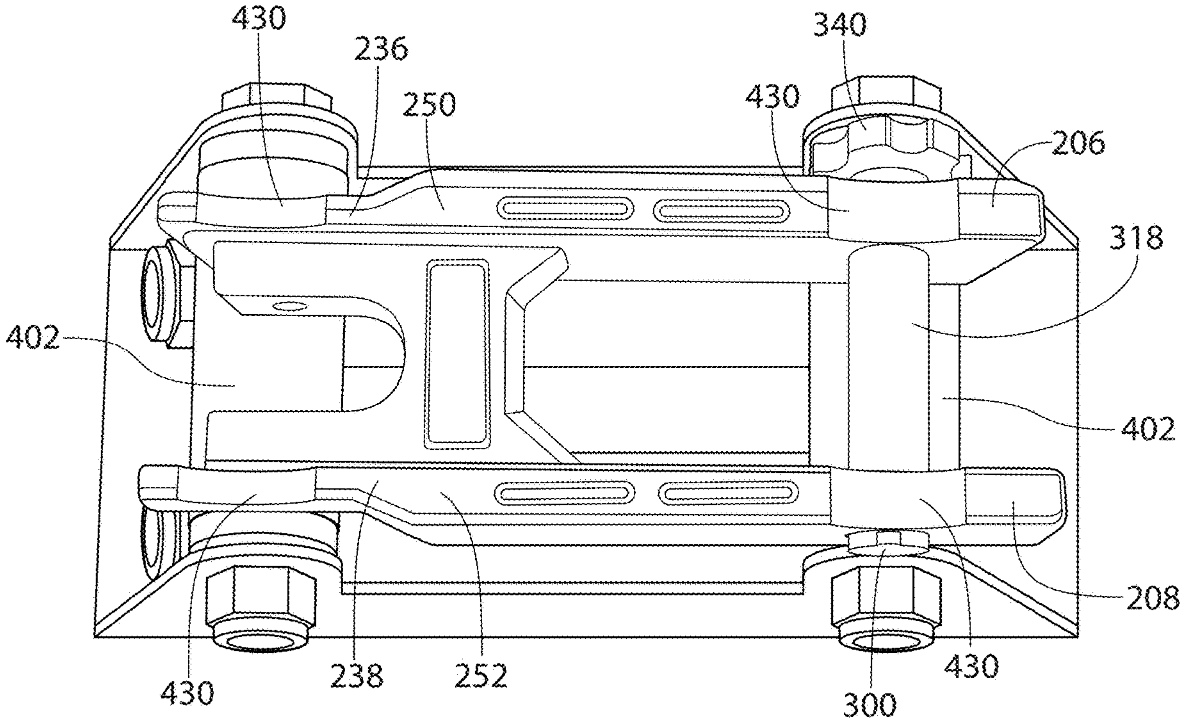

FIG. 15 is a perspective drawing of a winch hook that is suitable for mating with a roller fairlead. Hook 400 may include many similarities with hook 200. However, hook 400 includes features that enable hook 400 to mate with roller fairlead 410. For example, hook 400 includes notches 420 and notches 430 (illustrated in FIG. 16B) that enable hook 400 to mate with fairlead 410. Notches 420 and notches 430 are situated so that they correspond with the locations of vertical rollers 402. Furthermore, notches 420, 430 have a semicircular shape that corresponds to the shape of vertical rollers 402. Notches 420, 430 enable hook 400 to mate with fairlead 410 in (at least) four different orientations, similar to the four orientations of hook 200 that are illustrated in FIGS. 13A-13D. Additional features/included in hook 400 allows hook 400 to engage fairlead 410 for retention while driving. The geometry may engage a top of fairlead 410, the space between horizontal rollers 404, or other FIG. 16A and FIG. 16B illustrate two examples of different orientations of hook 400 when mated with fairlead 410. As in the earlier examples, hook 400 may be in at least four different orientations relative to fairlead 410.

As a result of the corresponding "fit" between notches 420, 430 and vertical rollers 402, hook 400 may be stored adjacent (or on) roller fairlead 410 while the vehicle to which roller fairlead 410 is attached is driven. A winch cable that is attached to hook 400 is retracted by a winch until hook 400 is pressing against fairlead 410. Hook 400 may include additional structure to maintain hook 400 stationary relative to fairlead 410. For example, hook 400 may include physical features that extend towards and make contact with the top surface of frame 406. As another example, a projection may extend from middle member 291 and into opening 112. As a result of the projection resting on horizontal roller 404, in combination with tension from a retracted winch cable holding hook 400 against fairlead 410, hook 400 remains stationary relative to fairlead 410 while the vehicle to which fairlead 410 is installed is driven. Other projections may also extend from hook 400 and rest on one or more surfaces of fairlead 410 in order to maintain hook 400 stationary (i.e. stored) relative to fairlead 410 while the vehicle to which fairlead 410 is installed is driven.

Figure 17:
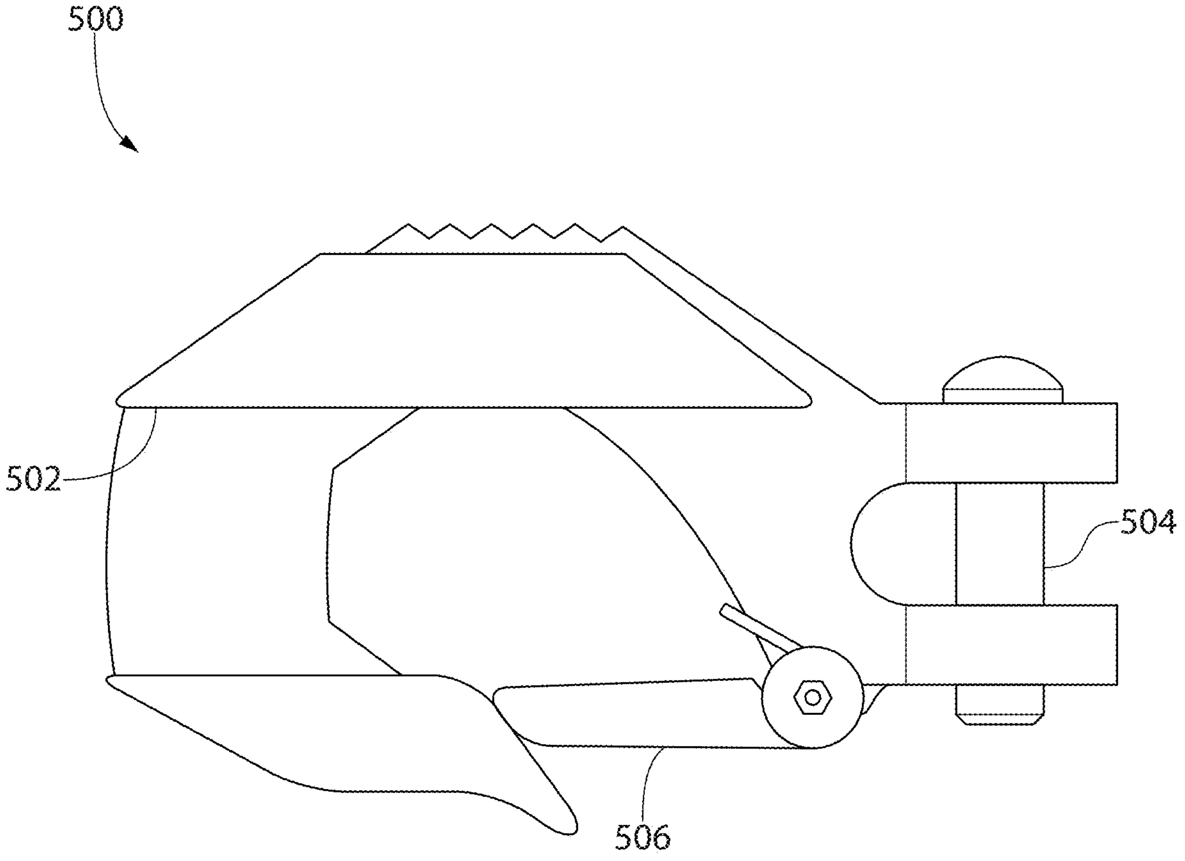
FIG. 17 is a front view of an exemplary hook in accordance with a further exemplary embodiment of the present invention.

The above description has referred to a hook with a fixed pin for creating an opening in which a tree saver (or other cable) may be retained. It is understood, however, that the above concepts may also be applied to a hook with a spring loaded retaining member. FIG. 17 illustrates spring loaded hook 500. Spring loaded hook 500 may have geometry 502 on both sides thereof (the side visible in FIG. 17 and the side of hook 500 opposite to the side visible in FIG. 17) in order to maintain hook 500 stationary relative to fairlead 110. Geometry 502 engages complementary geometry 180 included with fairlead 110. Exemplary orientations of hook 500 relative to fairlead 110 include clasp 506 down and pin 504 to the right, clasp 506 down and pin 504 to the left, clasp 506 up and pin 504 to the right, clasp 506 up and pin 504 to the left.

Figure 18:
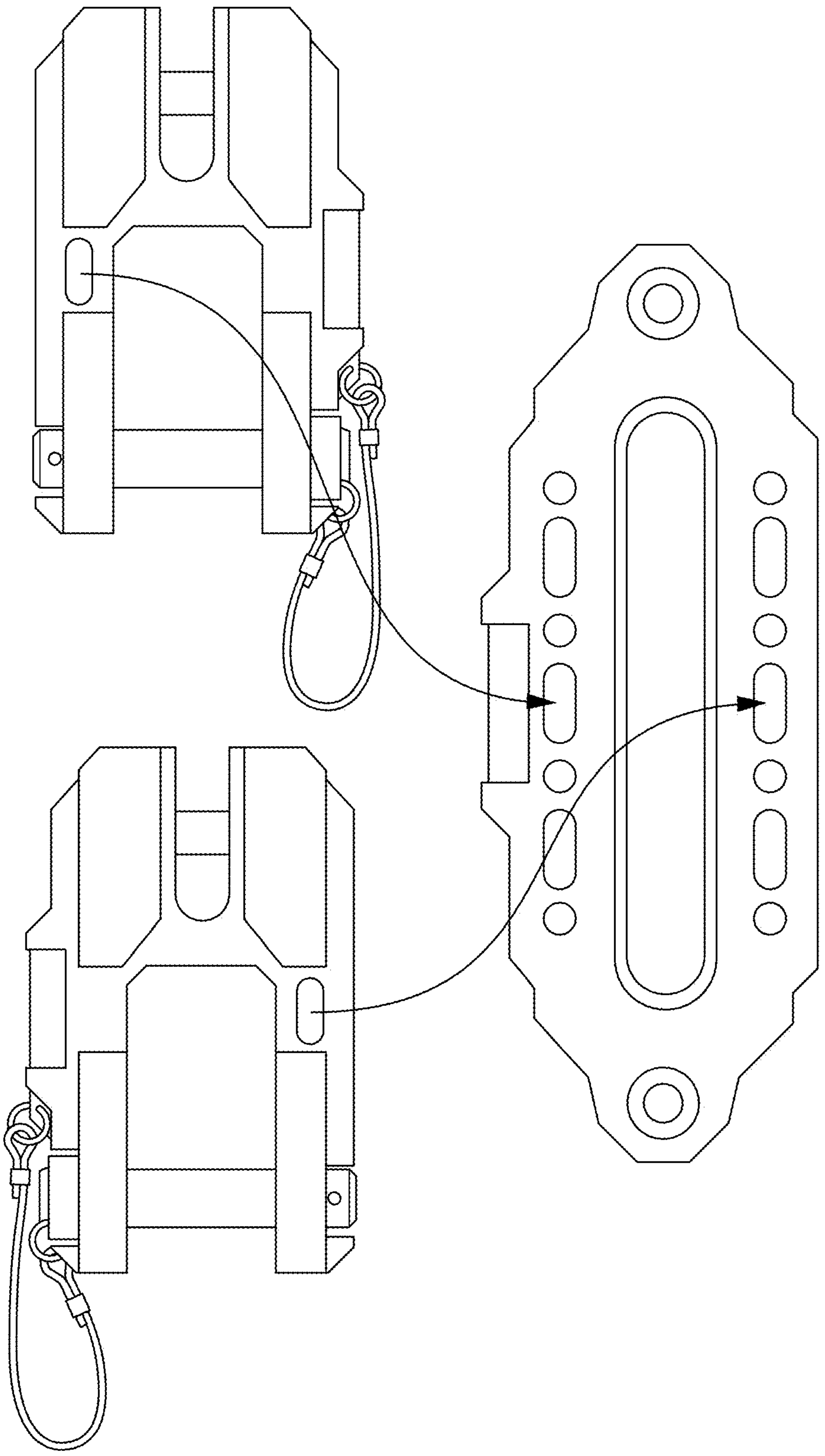
FIG. 18 is front view that illustrates a further exemplary structure for mating a hook with a fairlead in accordance with a further exemplary embodiment of the present invention.

The above explanations have included geometry on the fairlead and complementary geometry on the hook for engaging the hook with the fairlead. The exemplary geometry shown has included geometry extending along a width and exemplary geometry for engaging vertical (or horizontal) rollers, but other forms of engagement between the hook and the fairlead may be used. For example, fairlead 210 (or any other fairlead) may include an exemplary registration opening and hook 400 (or any other hook) may include an exemplary registration projection. The opening and projection may engage each other for enabling the hook to be stored stationary relative to the fairlead. As would be understood to one of ordinary skill in the art female/male configurations may be substituted for illustrated male/female configurations. See for example FIG. 18 in which a hook is shown in multiple exemplary orientations, wherein in each of those orientations a registration projection engages a registration opening included in the fairlead. As in other embodiments disclosed herein, the registration projection may be located on multiple sides and/or edges of the hook to enable the hook to engage the fairlead in at least four orientations.

The above description includes details regarding the hook being stored relative to a fairlead in four orientations, but it is understood that the hook may also be stored in additional orientations. Also, the hook may be stored in more than four orientations. Additional orientations include rotation of the hook an amount other than 180 degrees than what is illustrated. For example, the hook and fairlead may have matching physical shapes to enable the hook to be stored 90 degrees relative to the orientations illustrated and described herein. As another example, the hook and fairlead may have matching physical shapes to enable the hook to be stored along one of its edges (e.g. edges along the top, bottom, or sides of the hook illustrated in FIGS. 13A-13D) relative to the fairlead.

While various exemplary embodiments have been described, it is understood that embodiments may be combined. Also, aspects of one embodiment may be combined with aspects of another embodiment.

Whereas many alterations and modifications of the disclosure will no doubt become apparent to a person of ordinary skill in the art after having read the foregoing description, it is to be understood that any particular implementation shown and described by way of illustration is in no way intended to be considered limiting. Therefore, references to details of various implementations are not intended to limit the scope of the claims, which in themselves recite only those features regarded as the disclosure.

PARTS LIST

100 vehicle
102 bumper
104 winch
105 winch plate 106 cable
108 hook
110 fairlead
112 opening
114 loop
115 thimble
120 exit surface
122 edge
124 attachment location
140 rear
180 feature
200 hook
202 opening
204 opening
206 prong
208 prong
210 opening
212 opening
213 opening
226 first member
228 second member
236 prong
238 prong
240 first surface
242 second surface
280 opening
281 feature
291 middle member
213 opening
250 third surface
252 fourth surface
290 middle member
291 full member
292 partial member
300 end
310 tab
314 channel
316 indent
318 pin
340 knob

The invention claimed is:

1. A winch hook system, comprising:

a winch hook that is adapted to be coupled to a winch cable, said winch hook including a 1st projection and a 2nd projection on a first side of said winch hook, and a 3rd projection and a 4th projection on a second side of said winch book; and a fairlead having an opening and an indentation that is spaced from the opening; wherein a bottom surface of said indentation runs along a width of said fairlead, a left side projection extending upward from said bottom surface a right side projection extending upward from said bottom surface, in a 1$^{st}$ orientation of said winch hook relative to said fairlead:

said 1st projection mates with and sits on said bottom surface between said left side protection and said right side projection to prevent motion of said winch hook relative to said fairlead past said left side projection and said right side projection, said bottom surface opposes a first downward force of said 1st projection when said 1st projection of said winch hook mates with said bottom surface;

in a 2$^{nd}$ orientation of said winch hook relative to said fairlead, said winch hook rotated 180 degrees about a Y axis extending between a top and a bottom of said winch hook;

said 2$^{nd}$ projection mates with and sits on said bottom surface between said left side protection and said right side projection to prevent motion of said winch hook relative to said fairlead past said left side protection and said right side projection, said bottom surface opposes a second downward force of said 2nd projection when said second projection of said winch hook mates with said bottom surface;

in a 3$^{rd}$ orientation of said winch hook relative to said fairlead, said winch book rotated 180 degrees from said 2$^{nd}$ orientation about an x axis orthogonal to said y axis;

said third projection mates with and sits on said bottom surface between said left side projection and said right side projection to prevent motion of said winch hook relative to said fairlead past said left side projection and said right side projection, said bottom surface opposes a third downward force of said third projection when said third projection of said winch hook mates with said bottom surface;

in a 4$^{th}$ orientation of said winch book relative to said fairlead, said winch hook rotated 180 degrees from said 3$^{rd}$ orientation about said y axis:

said fourth projection mates with and sits on said bottom surface between said left side projection and said right side projection to prevent motion of said winch hook relative to said fairlead past said left side projection and said right side projection, said bottom surface opposes a fourth downward force of said fourth projection when said fourth projection of said winch hook mates with said bottom surface.

2. The winch hook system according to claim 1, wherein said opening is adapted to receive the winch cable, and said winch hook is adapted to be coupled to said winch cable.

3. A winch hook system according to claim 1, wherein said hook is maintained stationary relative to said fairlead while said fairlead is attached to a motorized vehicle.

4. A winch hook system according to claim 1, wherein said hook includes a hook pin that creates a closed-hook internal space.

5. A winch hook system according to claim 4, wherein:

in the 1st orientation, the hook pin is right side up and located towards a left side of the hook;

in the 2nd orientation, the hook pin is upside down and located towards the left side of the hook;

in the 3rd orientation, the hook pin is right side up and located towards a right side of the hook; and in the 4th orientation, the hook pin is upside down and located towards the right side of the hook.

6. A winch hook system according to claim 1, wherein said hook include a lead pin that creates a further closed-hook internal space adapted to receive said winch cable.

7. A method of engaging a winch hook to a fairlead, said method comprising the steps of:

moving the winch hook towards the fairlead; and storing the winch hook against the fairlead so that the hook is immobile relative to the fairlead, wherein the winch hook is stored against the fairlead wherein said winch hook including a 1st projection and a 2nd projection on a first side of said winch hook, and a 3rd projection and a 4th projection on a second side of said winch hook the fairlead having an opening and an indentation that is spaced from the opening; wherein a bottom surface of said indentation runs along a width of said fairlead, a left side projection extending upward from said bottom surface, a right side projection extending upward from said bottom surface, in a 1st orientation of said winch hook relative to said fairlead:

said 1st projection mates with and sits on said bottom surface between said left side projection and said right side projection to prevent motion of said winch hook relative to said fairlead past said left side projection and said right s de projection, said bottom surface opposes a first downward force of said 1st projection when said 1st projection of said winch hook mates with said bottom surface;

in a 2nd orientation of said winch hook relative to said fairlead said winch hook rotated 180 degrees about a Y axis extending between a top and a bottom of said winch book;

said 2nd projection mates with and sits on said bottom surface between said left side protection and said right side projection to prevent motion of said winch book relative to said fairlead past said left side projection and said right side projection, said bottom surface opposes a second downward force of said 2nd projection when said second projection of said winch book mates with said bottom surface;

in a 3rd orientation of said winch book relative to said fairlead, said winch book rotated 180 degrees from said 2nd orientation about an x axis orthogonal to said y axis;

said third projection mates with and sits on said bottom surface between said left side projection and said right side projection to prevent motion of said winch hook relative to said fairlead past said left side protection and said right side projection, said bottom surface opposes a third downward force of said third projection when said third projection of said winch hook mates with said bottom surface:

in a 4th orientation of said winch hook relative to said fairlead said winch hook rotated 180 degrees from said 3rd orientation about said y axis;

said fourth projection mates with and sits on said bottom surface between said left side projection and said right side projection to prevent motion of said winch hook relative to said fairlead past said left side projection and said right side projection, said bottom surface opposes a fourth downward force of said fourth projection when said fourth protection of said winch hook mates with said bottom surface.

8. A method according to claim 7, wherein the fairlead is attached to a motorized vehicle, and a winch cable extends through an opening of the fairlead and is coupled to the winch hook.

9. A method according to claim 8, said method further comprising the steps of:

spooling out a winch cable through the opening; and energizing a winch to retract the winch cable;

wherein retracting said winch cable causes said fairlead to be maintained stationary relative to said fairlead.

* * * * *